United States Patent
Baek et al.

(10) Patent No.: US 9,762,286 B2
(45) Date of Patent: Sep. 12, 2017

(54) COMMUNICATION APPARATUS AND METHOD

(71) Applicant: ELECTRONICS AND TELECOMMUNICATIONS RESEARCH INSTITUTE, Daejeon (KR)

(72) Inventors: Myung-Sun Baek, Daejeon (KR); Hyoungsoo Lim, Daejeon (KR); Sang-Woon Kwak, Daejeon (KR); Young-Su Kim, Daejeon (KR); Yun-Jeong Song, Daejeon (KR); Kyu-Tae Yang, Daejeon (KR); Joungil Yun, Daejeon (KR); Bongho Lee, Daejeon (KR); Jong-Suk Chae, Daejeon (KR); Nam-Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/008,268

(22) Filed: Jan. 27, 2016

(65) Prior Publication Data

US 2016/0218908 A1  Jul. 28, 2016

(30) Foreign Application Priority Data

Jan. 28, 2015 (KR) .......................... 10-2015-0013437

(51) Int. Cl.
H04B 1/713 (2011.01)
H04J 11/00 (2006.01)
H04L 5/00 (2006.01)

(52) U.S. Cl.
CPC .......... *H04B 1/713* (2013.01); *H04J 11/0023* (2013.01); *H04L 5/0012* (2013.01)

(58) Field of Classification Search
None
See application file for complete search history.

(56) References Cited

U.S. PATENT DOCUMENTS

| 8,514,966 | B2 | 8/2013 | Wajcer et al. | |
| 8,917,786 | B1* | 12/2014 | von der Embse | H04L 1/0047 375/260 |
| 2010/0158096 | A1 | 6/2010 | Yang et al. | |
| 2011/0167321 | A1 | 7/2011 | Hwang et al. | |
| 2015/0010118 | A1 | 1/2015 | Beidas et al. | |
| 2016/0191218 | A1* | 6/2016 | Bala | H04L 5/0007 370/203 |
| 2016/0308697 | A1* | 10/2016 | Gattami | H04L 25/497 |

* cited by examiner

*Primary Examiner* — Freshteh N Aghdam

(57) ABSTRACT

Provided is an apparatus for transmitting a signal based on a non-uniform inter-symbol interference (ISI) pattern, the apparatus that may transmit an output signal generated by modulating an input signal based on a parameter sequence to be used to control an interference pattern and a position of a transmission signal for each symbol using a faster than Nyquist (FTN) scheme.

11 Claims, 16 Drawing Sheets

FIG. 7A

| Code value #0 | Code value #1 | Code value #2 | Code value #3 | Code value #4 | Code value #5 | Code value #6 | Code value #7 |
|---|---|---|---|---|---|---|---|

FIG. 7B

| Code value #0 | Code value #1 | Code value #2 | Code value #3 | Code value #4 | Code value #5 | Code value #6 | Code value #7 | |
|---|---|---|---|---|---|---|---|---|

FIG. 7C

| Code value #0 | Code value #1 | Code value #2 | Code value #3 | Code value #4 | Code value #5 | Code value #6 | Code value #7 |
|---|---|---|---|---|---|---|---|
| $\tau_0$ | $\tau_1$ | $\tau_2$ | $\tau_3$ | $\tau_4$ | $\tau_5$ | $\tau_6$ | $\tau_7$ |

COMMUNICATION APPARATUS AND METHOD

CROSS-REFERENCE TO RELATED APPLICATION

This application claims the priority benefit of Korean Patent Application No. 10-2015-0013437, filed on Jan. 28, 2015, in the Korean Intellectual Property Office, the disclosure of which is incorporated herein by reference.

BACKGROUND

1. Field of the Invention

Embodiments relate to radio communications, and more particularly, to a method and apparatus for transmitting and receiving signals based on signal interference.

2. Description of the Related Art

A Nyquist rate is used to transmit signals without inter-symbol interference (ISI). In an orthogonal frequency division multiplexing (OFDM) system, a rate and a shape of a pulse are determined to transmit signals without ISI within an allowed bandwidth, which is referred to as Nyquist pulse generation. The pulse determined by the Nyquist pulse generation may have a maximum transmission rate without ISI within the provided bandwidth.

Meanwhile, faster than Nyquist (FTN) pulse generation is used to increase a transmission rate of the Nyquist pulse generation. FTN transmission inevitably causes ISI in a transmission signal. However, despite the ISI, the FTN transmission increases a predetermined extent of a symbol transmission rate without a loss of bit error rate (BER), when compared to the Nyquist rate.

Further, a direct sequence spread spectrum (DS-SS) and a frequency hopping spread spectrum (FH-SS) are used to secure a high security and efficient use of frequency resources. In the aforementioned frequency spread schemes, users transmit and receive signals by utilizing unique spread codes and frequency hopping patterns. Thus, the frequency spread schemes enable frequency sharing among multiple users and security communications through the unique codes and patterns.

SUMMARY

According to an aspect, there is provided a signal transmitting apparatus including a controller configured to control an interference pattern and a position of a transmission signal based on a parameter sequence associated with an overlapping level and a position of a signal for each symbol using a faster than Nyquist (FTN) scheme, and a transmitter configured to transmit an output signal generated by modulating an input signal based on the parameter sequence. The parameter sequence may be shared with a receiving apparatus through security communications using a security key. The output signal may be decoded into the input signal based on the parameter sequence. The modulating may include changing the overlapping level and the position of the signal for each symbol with respect to at least one of a time band and a frequency band based on the parameter sequence.

The controller may be configured to set a value of the parameter sequence with respect to the time band to be inversely proportional to a transmission rate, or set a value of the parameter sequence with respect to the frequency band to be inversely proportional to a range of the frequency band. In this example, the parameter sequence may be adaptively determined based on an applied variable.

According to another aspect, there is also provided a signal transmitting apparatus including a controller configured to control a spread code involved in bandwidth extension based on a parameter sequence associated with an overlapping level and a position of a signal for each symbol using an FTN scheme, and a transmitter configured to transmit a spread signal generated by extending a frequency band of an input signal using the spread code modulated based on the parameter sequence. The controller may be configured to overlap lengths of spread codes at a predetermined ratio by applying the same parameter sequence for each symbol, or overlap lengths of spread codes at different ratios using different parameter sequences for each symbol. The parameter sequence may be shared with a receiving apparatus through security communications using a security key. The spread signal may be decoded into the input signal and the spread code based on the parameter sequence.

According to still another aspect, there is also provided a signal transmitting apparatus including a controller configured to control a frequency hopping pattern based on a parameter sequence associated with an overlapping level and a position of a signal for each symbol using an FTN scheme, and a transmitter configured to transmit a signal based on the controlled frequency hopping pattern. An overlapping level of a center frequency may be controlled by applying the parameter sequence to a frequency band forming the frequency hopping pattern. Further, the parameter sequence may change at every frequency hopping interval.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 7A illustrates an example of a frequency spread code;

FIG. 7B illustrates an example of modulating the spread code of FIG. 7A based on the same parameter sequence according to an embodiment;

FIG. 7C illustrates an example of modulating the spread code of FIG. 7A based on different parameter sequences according to an embodiment;

DETAILED DESCRIPTION

Figure 1:
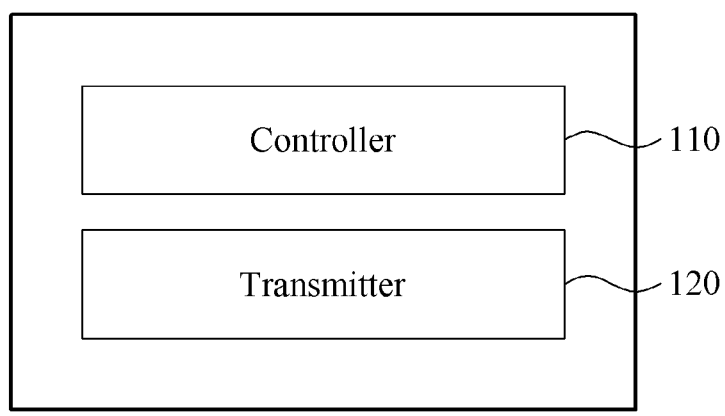
FIG. 1 is a block diagram illustrating a signal transmitting apparatus according to an embodiment.

Hereinafter, reference will now be made in detail to embodiments with reference to the accompanying drawings, wherein like reference numerals refer to like elements throughout. However, the scope of the disclosure is not limited by those embodiments.

The terms used herein are mainly selected from general terms currently being used in related art(s). However, other terms may be used depending on development and/or changes in technology, custom, or a preference of an operator. Thus, it should be understood that the terms used herein are terms merely used to describe the embodiments, rather terms intended to limit the spirit and scope of this disclosure.

In addition, in a specific case, most appropriate terms have been arbitrarily selected by the inventors for ease of description and/or for ease of understanding. In this instance, the meanings of the arbitrarily used terms will be clearly explained in the corresponding description. Hence, the terms should be understood not by the simple names of the terms, but by the meanings of the terms and the following overall description of this specification.

FIG. 1 is a block diagram illustrating a signal transmitting apparatus 100 according to an embodiment. Referring to FIG. 1, the signal transmitting apparatus 100 may include a controller 110 and a transmitter 120. The signal transmitting apparatus 100 may transmit signals using a faster than Nyquist (FTN) scheme. When signals are transmitted at an FTN rate faster than a Nyquist rate at which signals are transmitted without inter-symbol interference (ISI), artificial ISI may occur. Despite the inevitable ISI, interference information may be shared with a receiving apparatus. Thus, the signals may be transmitted without a loss of bit error rate (BER), and a symbol transmission rate may increase.

Figure 2:
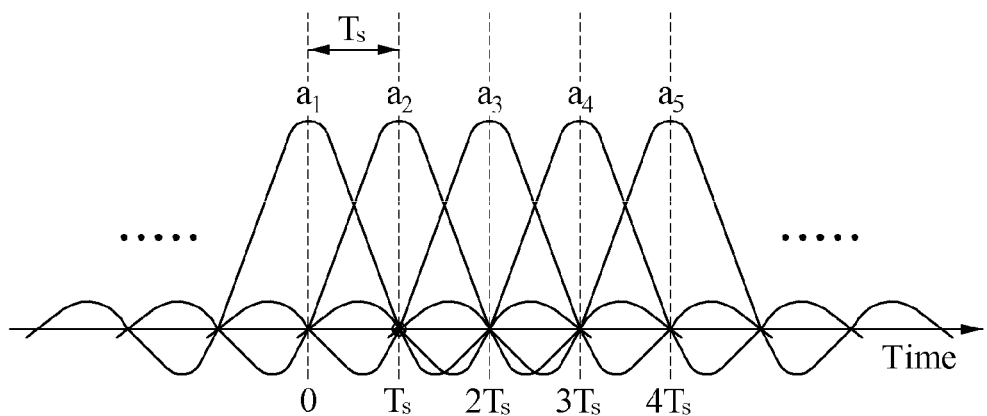
FIG. 2 is a graph showing signals transmitted at a Nyquist rate.

The controller 110 may control an interference pattern and a position of a transmission signal based on a parameter sequence associated with an overlapping level and a position of a signal for each symbol using the FTN scheme. For detailed descriptions, a graph showing signals transmitted at a Nyquist rate will be described with reference to FIG. 2. FIG. 2 is a graph showing signals transmitted at a Nyquist rate, in detail, pulses with respect to a time. When a symbol transmission interval at which signals may be transmitted without ISI is defined as a unit time $T_s$, the Nyquist rate indicates that signals are transmitted in an order of a1, a2, a3, and the like at intervals of $T_s$. Referring to the graph of FIG. 2, the signals a1, a2, a3, and the like are transmitted sequentially at $T_s$, $2T_s$, $3T_s$, and the like, respectively, and interference by signals other than the signals desired to be transmitted does not occur. For example, the signal a1 which is a previous signal of the signal a2 has a value of "0" at $T_s$ at which the signal a2 is transmitted, and thus interference by the signal a1 may be "0".

Figure 3:
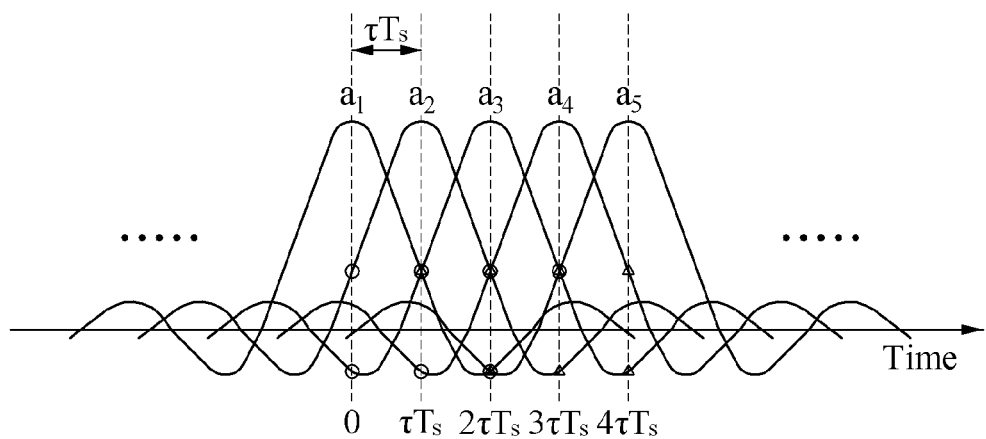
FIG. 3 is a graph showing signals transmitted by faster than Nyquist (FTN)

Meanwhile, FIG. 3 is a graph showing signals transmitted by FTN, in detail, a graph illustrating a method of transmitting signals a1, a2, a3, and the like having identical pulse shapes at intervals of $\tau \times T_s$ which is faster than $T_s$. Referring to the graph of FIG. 3, a transmission rate in the same bandwidth may increase when compared to a case in which signals are transmitted at a Nyquist rate. Here, $\tau$ denotes an FTN transmission parameter which indicates an artificial inter-symbol overlapping level and has a value ranging between "0" and "1" ($0<\tau<1$). As the value of $\tau$ decreases, the transmission rate may increase. When the value of $\tau$ is "1", the transmission rate may be the same as the Nyquist rate. For example, when $\tau$ is "0.5", signals may be transmitted at a rate two times faster than the Nyquist rate.

Referring to FIG. 1 again, the controller 110 may control the interference pattern and the position of the transmission signal based on the parameter sequence associated with the overlapping level and the position of the signal for each symbol using the FTN scheme as described above. The FTN transmission parameter $\tau$ is described as an example of the parameter sequence. By changing the value of $\tau$, signals may be transmitted at a transmission rate faster than the Nyquist rate. In detail, as the value of $\tau$ decreases toward "0", positions of signals may be shifted leftward on the graph. Thus, an overlapping level of the signals may increase, and the signals may form a pattern in which great interference occurs. Referring to FIG. 3, when transmitting the signal a1, in detail, when a value of the time is "0", a portion of the subsequent signal a2 overlaps the signal a1. When transmitting the signal a2, both a portion of the previous signal a1 and a portion of the subsequent signal a3 overlap the signal a2. In this example, the same value of $\tau$ is applied to all intervals $T_s$ and thus, uniform interference may occur. Accordingly, when a terminal receiving the signals is aware of the value of $\tau$, the terminal may detect the original signals by removing the interference. In an embodiment, the parameter sequence may be shared with a receiving apparatus through security communications using a security key so that only an allowed receiving apparatus may decode received data into the original data transmitted by a transmitting apparatus.

Figure 4:
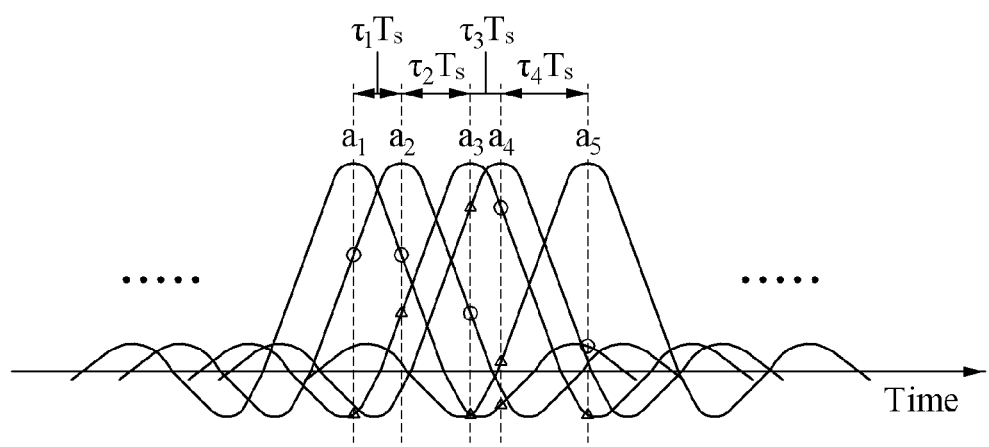
FIG. 4 is a graph showing signals transmitted by a signal transmitting apparatus according to an embodiment.

FIG. 4 is a graph showing signals transmitted by the signal transmitting apparatus 100 of FIG. 1 according to an embodiment. The controller 110 may control an interference pattern and positions of transmission signals based on a parameter sequence. The positions of the transmission signals may be changed based on the same single value of $\tau$ and uniform interference may occur as shown in FIG. 3. However, different values of $\tau$ may be applied to the signals as shown in FIG. 4. Symbol transmission intervals at which signals a1, a2, a3, a4, and a5 may be transmitted without interference may be denoted by $T_s$. FIG. 4 illustrates an interference pattern and positions of the signals in a case in which different values of $\tau$, for example, $\tau_1$, $\tau_2$, and $\tau_3$, are applied to the respective intervals of $T_s$. In detail, in FIG. 4, parameter sequences may be $\tau_1$, $\tau_2$, and $\tau_3$. Since the transmission intervals $\tau_1 T_s$, $\tau_2 T_s$, and $\tau_3 T_s$ have different lengths due to the parameter sequences, non-uniform interference may occur when transmitting the signals. However, when a receiving apparatus receiving the signals is aware of $\tau_1$, $\tau_2$, and $\tau_3$, the receiving apparatus may generate the original signals a1, a2, a3, a4, and a5 by removing the non-uniform interference.

Referring to FIG. 1 again, the transmitter 120 may transmit an output signal generated by modulating an input signal based on the parameter sequence. In detail, positions of transmission signals may be changed based on the parameter sequence, and an output signal may be generated in a form in which the signals overlap each other in response to the interference pattern. When the parameter sequence is applied to at least one of a time band and a frequency band, the output signal may have a time band or a frequency band shorter than the time band or the frequency band of the input signal. Thus, the transmission rate may increase and the frequency band used to transmit the signals may decrease based on an overlapping level of the signals by the parameter sequence, whereby time or frequency resources may be saved. As described above, the output signal generated by the transmitter 120 may be decoded into the input signal based on the parameter sequence. Accordingly, the receiving apparatus with which the parameter sequence is shared may receive the output signal and obtain the input signal.

Figure 5A:
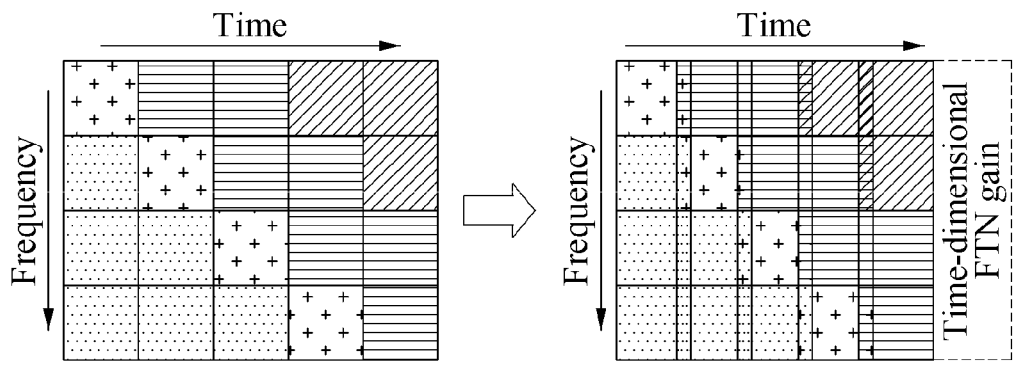
FIG. 5A is a diagram illustrating an example of applying an FTN signal transmitting and receiving method to a time band according to an embodiment.
Figure 5B:
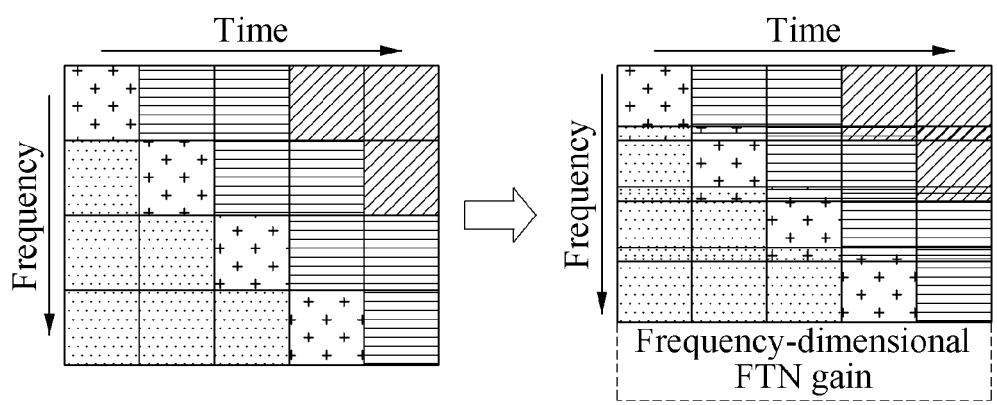
FIG. 5B is a diagram illustrating an example of applying an FTN signal transmitting and receiving method to a frequency band according to an embodiment.

FIG. 5A is a diagram illustrating an example of applying an FTN signal transmitting and receiving method to a time band according to an embodiment, and FIG. 5B is a diagram illustrating an example of applying an FTN signal transmitting and receiving method to a frequency band according to an embodiment. Referring to FIG. 5A, a time gain corresponding to an overlapping level of signals that overlap each other due to interference occurring in a time band may be obtained. By controlling a transmission interval, a greater amount of data may be transmitted for the same time period. Although interference occurs, the interference occurs artificially based on a parameter sequence. Thus, when the parameter sequence is shared with a receiving apparatus, the artificial interference may be removed and the received data may be decoded into the original data. Accordingly, the controller 110 may set a value of the parameter sequence with respect to the time band to be inversely proportional to the transmission rate. Referring to FIG. 5B, a frequency gain corresponding to an overlapping level of signals that overlap each other due to interference occurring in a frequency band may be obtained. Frequency resources are limited. Thus, if signals are transmitted and received using a relatively narrow band, the overall data transmission efficiency may increase. Accordingly, the controller 110 may set a value of the parameter sequence with respect to the frequency band to be inversely proportional to a range of the frequency band.

Figure 5C:
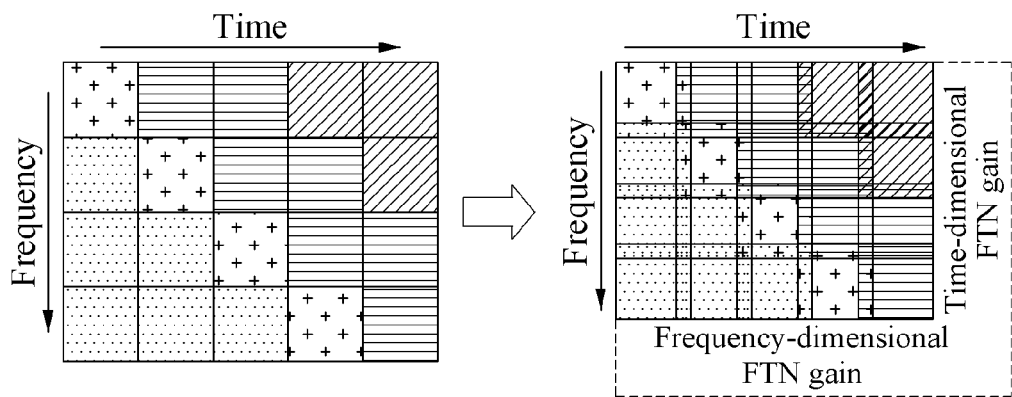
FIG. 5C is a diagram illustrating an example of applying an FTN signal transmitting and receiving method to both a time band and a frequency band according to an embodiment.

The controller 110 may change the overlapping level and the position of the signal for each symbol by applying the FTN signal transmitting and receiving method to both the time band and the frequency band based on the parameter sequence. In detail, the transmission interval may be shortened by applying a corresponding parameter sequence to the time band, and signals may be transmitted using an overlapping frequency band by applying a corresponding parameter sequence to the frequency band. FIG. 5C is a diagram illustrating an example of applying an FTN signal transmitting and receiving method to both a time band and a frequency band according to an embodiment. Referring to FIG. 5C, a transmission time and a frequency band may be saved simultaneously. Thus, the same data may be transmitted and received using fewer resources, and the overall data transmission efficiency may increase. Accordingly, when at least two parameter sequences are used, the parameter sequences may be determined adaptively based on a variable to be applied, for example, the time band or the frequency band.

In relation to an embodiment of applying the FTN signal transmitting and receiving method to the frequency band, an interference pattern may be formed by applying the to parameter sequence to a subcarrier interval of an orthogonal frequency division multiplexing (OFDM) system. In detail, by shortening the subcarrier interval by a ratio of $\tau$ (for example, $0<\tau<1$) and transmitting signals at the shortened subcarrier interval, a greater amount of data may be transmitted in the same frequency bandwidth. Subcarrier interference which occurs may be removed by a receiving apparatus with which $\tau$ is shared. Further, the FTN signal transmitting and receiving method may be applied to a transmission signal and the subcarrier. In detail, symbols to which the frequency-level FTN signal transmitting and receiving method is applied may be transmitted while overlapping each other based on an interference pattern. The symbols may be a plurality of symbols having intervals narrower than those of typical OFDM symbols. Thus, a greater amount of data may be transmitted for the same time period in the same frequency bandwidth. In this example, inter-subcarrier interference and ISI may be removed by the receiving apparatus. Different parameter sequences may be applied to the variables. The parameter sequence may be shared with the receiving apparatus, whereby an accuracy of data transmission and reception may be guaranteed.

A signal transmitting apparatus according to an embodiment may apply the same value of the parameter sequence to symbols, or may apply different values of the parameter sequence to symbols. To apply the same value of the parameter sequence, the parameter sequence may be defined to have a single value of $\tau$. Conversely, to apply different values of the parameter sequence, the parameter sequence may be defined as expressed by $T=[\tau_1, \tau_2, \tau_3, \tau_4, \tau_5]=[1, 0.8, 0.7, 0.5, 0.4]$. In a case in which the parameter sequence defined to have a predetermined number of different values is used, a relatively complex parameter sequence is to be known to decode a signal into the original signal when compared to a case in which the parameter sequence having the single value is applied. Thus, the security may improve.

Figure 6A:
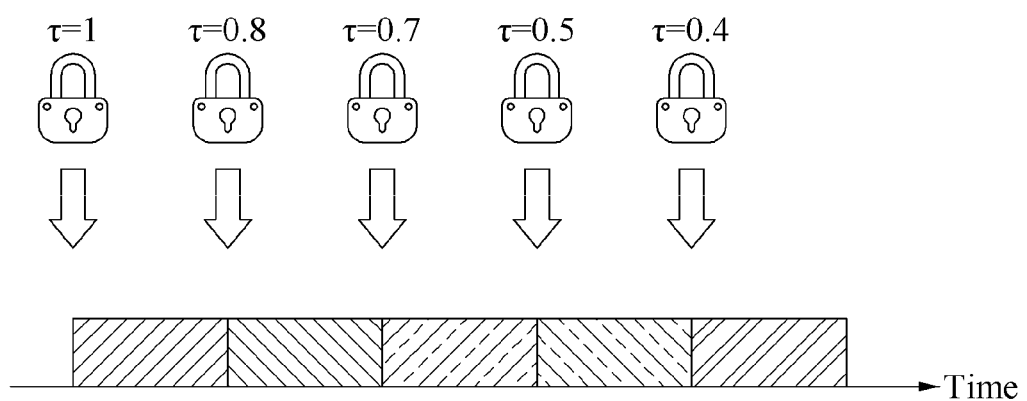
FIGS. 6A and 6B are diagrams illustrating an example of applying a parameter sequence to a frequency spread code according to an embodiment.
Figure 6B:
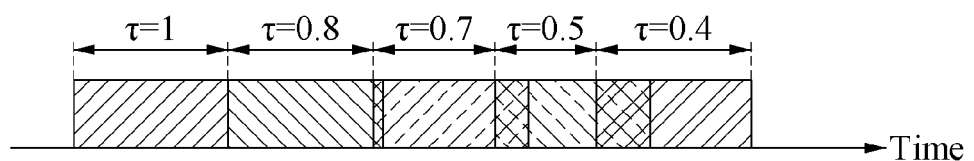

FIGS. 6A and 6B are diagrams illustrating an example of applying a parameter sequence having different values according to an embodiment. An input signal of FIG. 6A may be modulated into an output signal of FIG. 6B by controlling an interference pattern with respect to a time band using a parameter sequence having values of $T=[1, 0.8, 0.7, 0.5, 0.4]$. An overlapping level may change at each transmission interval. When the parameter sequence has a value close to "0", the overlapping level may increase. Conversely, when the parameter sequence has a value of "1", signals may not overlap each other, and the signals may be modulated based on the original transmission interval.

When transmitting data signals, the signals may be transmitted and received by modulating bitstreams using phase shift keying (PSK) or quadrature amplitude modulation (QAM). In this example, channel encoding and interleaving may be applied to bitstreams yet to be modulated. In addition, security transmission technology such as direct sequence spread spectrum (DS-SS), frequency hopping spread spectrum (FH-SS), and time hopping spread spectrum (TH-SS) may be applied to the modulation process.

DS-SS, the most representative technology, is a method of performing spread spectrum by applying a code of a relatively long period to a narrowband signal. A spread code may be applied to transmission data to perform spread spectrum. A receiving apparatus may perform inverse spread spectrum and signal detection by utilizing the spread code. In the process of performing inverse spread spectrum for signal detection, power of data may increase in proportion to a length of the spread code. Thus, inverse spread spectrum utilizing a long code may be effective to increase stability of signals and performance. However, in response to a long length, a transmission rate may decrease. Thus, a code with a proper length may be selected and utilized. In this example, an interference pattern and a position of a transmission signal being the spread code may be controlled based on a parameter sequence using an FTN scheme.

The controller 110 may control a spread code involved in bandwidth extension based on a parameter sequence associated with an overlapping level and a position of a signal for each symbol using an FTN scheme. The transmitter 120 may transmit a spread signal generated by extending a frequency band of an input signal using the spread code modulated based on the parameter sequence. FIG. 7A illustrates an example of a frequency spread code. In general, a spread code includes "1" and "−1". When a receiving apparatus is unaware of a spread code of DS-SS, a reception signal may not be demodulated. Data may be transmitted and received when a spread code is shared between a transmitting apparatus and an allowed receiving apparatus. Thus, communication security may increase. Further, when the parameter sequence using the FTN scheme is used, an efficiency of the spread code may increase in that a length of the spread code may be shortened, and security of the spread code may be considerably enhanced in that a reception signal may be demodulated when the spread code and the parameter sequence are shared.

The controller 110 may overlap lengths of spread codes at a predetermined ratio by applying the same parameter sequence for each symbol. Further, the controller 110 may overlap lengths of spread codes at different ratios using different parameter sequences for each symbol. FIG. 7B illustrates an example of modulating the spread code of FIG. 7A based on the same parameter sequence according to an embodiment, and FIG. 7C illustrates an example of modulating the spread code of FIG. 7A based on different parameter sequences according to an embodiment. In the example of FIG. 7B, constituent units a code value #0, a code value #1, a code value #2, and the like of the spread code may uniformly overlap each other based on the same value of the parameter sequence. In the example of FIG. 7C, constituent units of the spread code may non-uniformly overlap each other based on different values of the parameter sequence. Since the original spread code is changed to a new spread code by multiplying a length of the original spread code by a value of the parameter sequence, the parameter sequence may be expressed as a value ranging from "0" to "1". When the parameter sequence has a value of "1", the constituent units of the spread code may not overlap each other and the spread code may have the original length. As the value of the parameter sequence decreases toward "0", an overlapping level of the constituent units may increase, and thus the total length of the spread code may decrease.

As described above, the parameter sequence may be shared with the receiving apparatus through security communications using a security key. The spread signal transmitted by the transmitter 120 may be decoded into the input signal and the spread code based on the parameter sequence. In a case in which the constituent units overlap each other based on different values of the parameter sequence as shown in FIG. 7C, rather than applying a single value of the parameter sequence to constituent units of a spread code, a position of the code and interference need to be known to detect signals. Thus, the security may considerably improve.

Figure 8A:
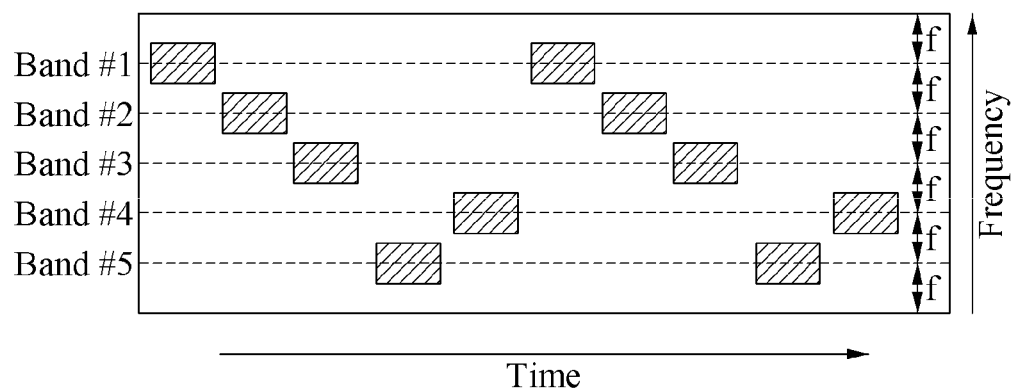
FIG. 8A illustrates an example of transmitting signals based on a frequency hopping pattern formed using five frequency bands.

FH-SS, one of the frequency spread technologies, is a method of transmitting and receiving signals selectively using a predetermined frequency band based on a predetermined rule over time. The predetermined rule is referred to as a frequency hopping pattern. FIG. 8A illustrates an example of transmitting signals based on a frequency hopping pattern formed using five frequency bands. In this example, the frequency hopping pattern may be [1, 2, 3, 5, 4].

The frequency hopping pattern may be shared between a transmitting apparatus and a receiving apparatus to transmit and receive data therebetween. In detail, the receiving apparatus may need to change a reception band based on the frequency hopping pattern to receive signals. Thus, when the receiving apparatus is unaware of the frequency hopping pattern, the receiving apparatus may not receive the signals. When transmitting signals based on a typical frequency hopping pattern, a frequency bandwidth f may be set in view of a sufficient frequency separation distance greater than a signal bandwidth to minimize interference between the signals, as shown in FIG. 8A. In this example, a parameter sequence using the FTN scheme may be applied to the frequency hopping pattern. The controller 110 may control the frequency hopping pattern based on a parameter sequence associated with an overlapping level and a position of a signal for each symbol using the FTN scheme. The transmitter 120 may transmit signals based on the controlled frequency hopping pattern. An overlapping level of a center frequency may be controlled by applying the parameter sequence to a frequency band forming the frequency hopping pattern.

Figure 8B:
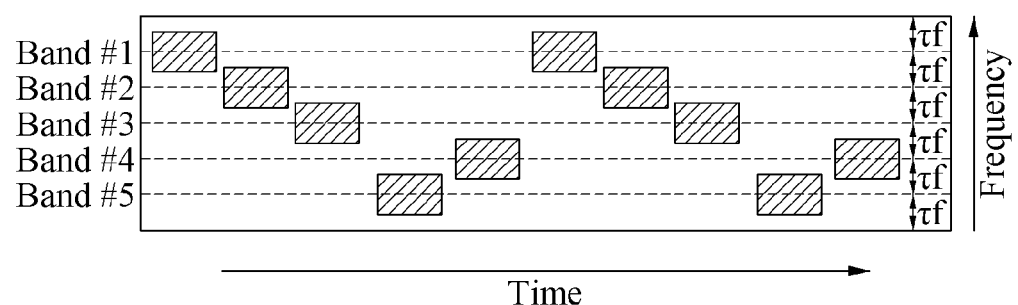
FIG. 8B illustrates an example of modulating the frequency hopping pattern of FIG. 8A based on the same parameter sequence according to an embodiment.
Figure 8C:
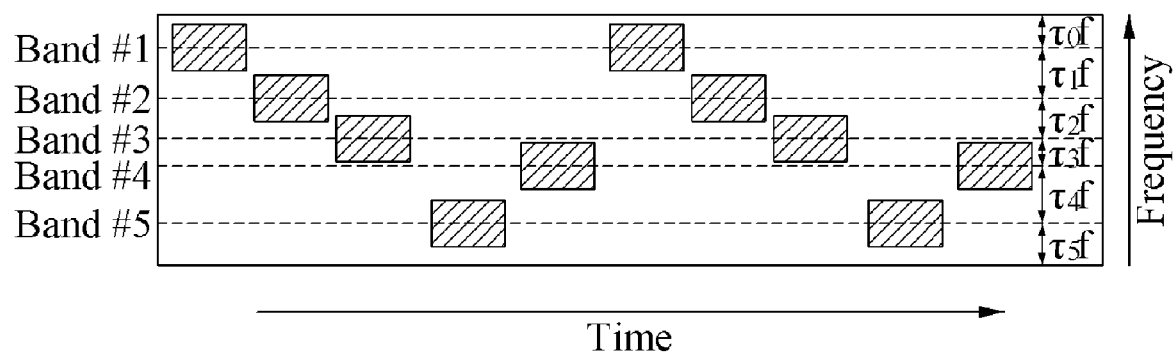
FIG. 8C illustrates an example of modulating the frequency hopping pattern of FIG. 8A based on different parameter sequences according to an embodiment.

As described above, in the changed frequency hopping pattern, each transmission bandwidth may be reduced to be less than or equal to a signal bandwidth, and a center frequency may also be changed. FIG. 8B illustrates an example of modulating the frequency hopping pattern of FIG. 8A based on the same parameter sequence according to an embodiment, and FIG. 8C illustrates an example of modulating the frequency hopping pattern of FIG. 8A based on different parameter sequences according to an embodiment. A receiving apparatus needs to share, with a transmitting apparatus, both the frequency hopping pattern and a value of the center frequency changed based on the parameter sequence to receive signals properly. Thus, the parameter sequence and the frequency hopping pattern may be shared with the receiving apparatus through security communications using a security key.

Figure 8D:
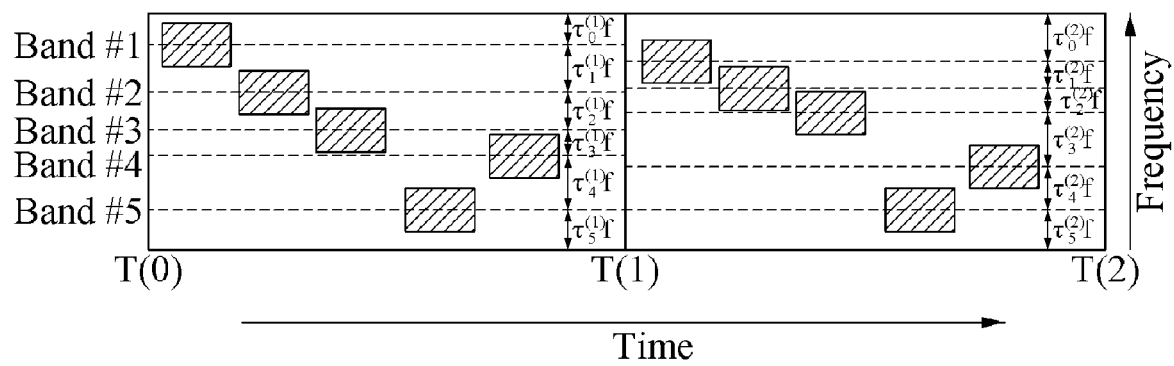
FIG. 8D illustrates an example of changing a parameter sequence based on a frequency hopping interval and applying the changed parameter sequence according to an embodiment.

Further, the frequency hopping pattern may be updated at every hopping interval. In this example, the parameter sequence may also be updated and changed to have a value different from the previous value of the parameter sequence. FIG. 8D illustrates an example of changing a parameter sequence based on a frequency hopping interval and applying the changed parameter sequence according to an embodiment. Referring to FIG. 8D, $\tau_0^{(1)}f$, $\tau_1^{(1)}f$, $\tau_2^{(1)}f$, $\tau_3^{(1)}f$, $\tau_4^{(1)}f$, and $\tau_5^{(1)}f$ may be applied during a hopping interval between T(0) and T(1), and $\tau_0^{(2)}f$, $\tau_1^{(2)}f$, $\tau_2^{(2)}f$, $\tau_3^{(2)}f$, $\tau_4^{(2)}f$, and $\tau_5^{(2)}f$ may be applied during a subsequent hopping interval between T(1) and T(2), whereby a center frequency may be changed.

According to the embodiments described above, a signal transmitting apparatus may transmit a signal coded with respect to a bitstream based on a predetermined ISI pattern. Only a receiving apparatus having an interference pattern same as the interference pattern used by the transmitting apparatus may restore the bitstream from the received coded signal. The interference pattern may be controlled based on a parameter sequence. The transmitting apparatus and the receiving apparatus may share the parameter sequence through security communications using a security key, thereby causing or removing interference. In addition to the embodiments, by applying a parameter sequence using an FTN scheme to various frequency spread technologies, the transmission efficiency and the security may improve.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A signal transmitting apparatus comprising:
a controller configured to control an interference pattern and a position of a transmission signal based on a parameter sequence associated with an overlapping level and a position of a signal for each symbol using a faster than Nyquist (FTN) scheme; and
a transmitter configured to transmit an output signal generated by modulating an input signal based on the parameter sequence,
wherein the modulating comprises changing the overlapping level and the position of the signal for each symbol with respect to at least one of a time band and a frequency band based on the parameter sequence, and
wherein the controller is configured to set a value of the parameter sequence with respect to the frequency band to be inversely proportional to a range of the frequency band.

2. The apparatus of claim 1, wherein the parameter sequence is shared with a receiving apparatus through security communications using a security key.

3. The apparatus of claim 1, wherein the output signal is decoded into the input signal based on the parameter sequence.

4. The apparatus of claim 1, wherein the controller is configured to set a value of the parameter sequence with respect to the time band to be inversely proportional to a transmission rate.

5. The apparatus of claim 1, wherein the parameter sequence is adaptively determined based on an applied variable.

6. A signal transmitting apparatus comprising:
a controller configured to control a spread code involved in bandwidth extension based on a parameter sequence associated with an overlapping level and a position of a signal for each symbol using a faster than Nyquist (FTN) scheme; and
a transmitter configured to transmit a spread signal generated by extending a frequency band of an input signal using the spread code modulated based on the parameter sequence,
wherein the controller is configured to overlap lengths of spread codes at different ratios using different parameter sequences for each symbol.

7. The apparatus of claim 6, wherein the controller is configured to overlap lengths of spread codes at a predetermined ratio by applying the same parameter sequence for each symbol.

8. The apparatus of claim 6, wherein the parameter sequence is shared with a receiving apparatus through security communications using a security key.

9. The apparatus of claim 6, wherein the spread signal is decoded into the input signal and the spread code based on the parameter sequence.

10. A signal transmitting apparatus comprising:
a controller configured to control a frequency hopping pattern based on a parameter sequence associated with an overlapping level and a position of a signal for each symbol using a faster than Nyquist (FTN) scheme; and
a transmitter configured to transmit a signal based on the controlled frequency hopping pattern, wherein an overlapping level of a center frequency is controlled by applying the parameter sequence to a frequency band included in the frequency hopping pattern.

11. The apparatus of claim 10, wherein the parameter sequence changes at every frequency hopping interval.

* * * * *